(12) United States Patent
Johnson et al.

(10) Patent No.: US 10,267,199 B2
(45) Date of Patent: Apr. 23, 2019

(54) ANGLED SENSOR MOUNT FOR USE WITH A SINGLE MODULE AFTERTREATMENT SYSTEM OR THE LIKE

(71) Applicant: Cummins Emission Solutions Inc., Columbus, IN (US)

(72) Inventors: Ryan M. Johnson, Cottage Grove, WI (US); Randolph G. Zoran, McFarland, WI (US); Shri R. Sunilkumar, Dandeli (IN)

(73) Assignee: Cummins Emission Solutions Inc., Columbus, IN (US)

( * ) Notice: Subject to any disclaimer, the term of this patent is extended or adjusted under 35 U.S.C. 154(b) by 135 days.

(21) Appl. No.: 15/218,519

(22) Filed: Jul. 25, 2016

(65) Prior Publication Data

US 2017/0030238 A1 Feb. 2, 2017

Related U.S. Application Data

(60) Provisional application No. 62/197,902, filed on Jul. 28, 2015.

(51) Int. Cl.
*A61L 9/00* (2006.01)
*F01N 3/28* (2006.01)
(Continued)

(52) U.S. Cl.
CPC ............... *F01N 3/28* (2013.01); *F01N 3/021* (2013.01); *F01N 3/0335* (2013.01);
(Continued)

(58) Field of Classification Search
CPC ............... B01F 3/04049; F01N 3/2892; F01N 13/1805; B01D 53/9431
(Continued)

(56) References Cited

U.S. PATENT DOCUMENTS

| 4,673,423 A | 6/1987 | Yumlu |
| 5,043,146 A | 8/1991 | Ishikawa et al. |

(Continued)

FOREIGN PATENT DOCUMENTS

| CN | 2537449 | 2/2003 |
| CN | 102527231 | 7/2012 |

(Continued)

OTHER PUBLICATIONS

International Search Report and Written Opinion for PCT/US2015/067302, dated Mar. 11, 2016, 10 pages.

(Continued)

*Primary Examiner* — Monzer R Chorbaji
(74) *Attorney, Agent, or Firm* — Foley & Lardner LLP

(57) ABSTRACT

Implementations described herein relate to features for a single module aftertreatment system. The single module aftertreatment system includes a casing, a catalyst within the casing, and a sensor mount coupled to the casing. The sensor mount is angled relative to a portion of the casing at a position where the sensor mount is coupled to the casing. The sensor mount includes a first attachment leg, a second attachment leg, and an angled mounting portion. The angled mounting portion connects the first attachment leg to the second attachment leg. The sensor mount is coupled to the casing by the first attachment leg and the second attachment leg such that the first attachment leg, the second attachment leg, and the angled mounting portion form an air gap relative to the casing.

16 Claims, 2 Drawing Sheets

(51) Int. Cl.
*F01N 3/20* (2006.01)
*F01N 3/021* (2006.01)
*F01N 3/033* (2006.01)
*F01N 13/00* (2010.01)
*B01D 53/94* (2006.01)

(52) U.S. Cl.
CPC ......... *F01N 3/2066* (2013.01); *F01N 13/009* (2014.06); *B01D 53/9431* (2013.01); *B01D 53/9495* (2013.01); *B01D 2251/2062* (2013.01); *B01D 2251/2067* (2013.01); *B01D 2258/012* (2013.01); *F01N 2560/02* (2013.01); *F01N 2560/08* (2013.01); *F01N 2610/02* (2013.01); *Y02T 10/24* (2013.01)

(58) Field of Classification Search
USPC ................. 422/105, 119, 122, 168, 211, 307
See application file for complete search history.

(56) References Cited

U.S. PATENT DOCUMENTS

| | | | |
|---|---|---|---|
| 5,611,832 | A | 3/1997 | Suzuki et al. |
| 6,475,944 | B1 | 11/2002 | Yang et al. |
| D590,419 | S | 4/2009 | Duffek et al. |
| 8,341,949 | B2 | 1/2013 | Tarabulski |
| 8,609,047 | B2 | 12/2013 | Dotzel et al. |
| D702,735 | S | 4/2014 | Sandou |
| D757,919 | S | 5/2016 | Kimura |
| D794,100 | S | 8/2017 | McDonald et al. |
| 2003/0221424 | A1 | 12/2003 | Woerner et al. |
| 2007/0039316 | A1 | 2/2007 | Bosanec et al. |
| 2008/0060351 | A1 | 3/2008 | Pawson et al. |
| 2009/0084094 | A1 | 4/2009 | Goss et al. |
| 2009/0136387 | A1 | 5/2009 | Picton et al. |
| 2010/0242451 | A1 | 9/2010 | Werni et al. |
| 2010/0300082 | A1 | 12/2010 | Zhang |
| 2011/0030351 | A1 | 2/2011 | Kato |
| 2011/0047973 | A1 | 3/2011 | Wilhelm et al. |
| 2011/0052454 | A1 | 3/2011 | Kato |
| 2011/0099978 | A1 | 5/2011 | Davidson et al. |
| 2012/0004863 | A1 | 1/2012 | Ardanese et al. |
| 2012/0210697 | A1 | 8/2012 | Garimella et al. |
| 2013/0125524 | A1 | 5/2013 | Plummer et al. |
| 2013/0213008 | A1* | 8/2013 | Kumar ................. F01N 3/2006 60/274 |
| 2013/0232958 | A1 | 9/2013 | Ancimer et al. |
| 2014/0007562 | A1 | 1/2014 | Justin |
| 2014/0260202 | A1 | 9/2014 | Bays et al. |
| 2014/0262590 | A1 | 9/2014 | Daborn et al. |
| 2014/0363358 | A1 | 12/2014 | Udd et al. |
| 2014/0373721 | A1 | 12/2014 | Sandou et al. |
| 2015/0000389 | A1 | 1/2015 | Runde et al. |
| 2015/0128566 | A1 | 5/2015 | Osumi |
| 2015/0224870 | A1 | 8/2015 | Shin et al. |
| 2016/0069239 | A1 | 3/2016 | Freeman et al. |
| 2016/0076430 | A1 | 3/2016 | Freeman et al. |
| 2016/0115847 | A1 | 4/2016 | Chapman et al. |
| 2016/0245207 | A1 | 8/2016 | Ball et al. |
| 2016/0326931 | A1 | 11/2016 | Freeman et al. |
| 2016/0369940 | A1 | 12/2016 | Patil et al. |
| 2017/0036165 | A1 | 2/2017 | Schmid et al. |
| 2017/0043295 | A1 | 2/2017 | Minezawa et al. |
| 2017/0074146 | A1 | 3/2017 | Maletic et al. |
| 2017/0089248 | A1 | 3/2017 | Evans et al. |

FOREIGN PATENT DOCUMENTS

| | | |
|---|---|---|
| EM | 002840355-001 | 10/2015 |
| EM | 002840355-002 | 10/2015 |
| EM | 002840355-003 | 10/2015 |
| EM | 002840355-004 | 10/2015 |
| WO | WO 2016/109320 | 7/2016 |
| WO | WO 2016/109321 | 7/2016 |
| WO | WO 2016/109323 | 7/2016 |

OTHER PUBLICATIONS

International Search Report and Written Opinion for PCT/US2015/067317, dated Apr. 22, 2016, 18 pages.
International Search Report and Written Opinion for PCT/US2015/067324, dated Feb. 23, 2016, 8 pages.
Office Action cited for U.S. Appl. No. 15/539,886, dated Mar. 1, 2018, 14 pages.
Chinese Office Action issued for 201580070306.7, dated Oct. 13, 2018, 8 pages.
Non-Final Office Action in U.S. Appl. No. 15/539,954 dated Sep. 7, 2018.

* cited by examiner

ANGLED SENSOR MOUNT FOR USE WITH A SINGLE MODULE AFTERTREATMENT SYSTEM OR THE LIKE

CROSS REFERENCE TO RELATED APPLICATIONS

The present application claims the benefit of priority to U.S. patent application No. 62/197,902, filed Jul. 28, 2015, the contents of which are incorporated herein by reference in their entirety.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a SCR process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, or ureab is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system up-stream of the catalyst chamber. The SCR system may include one or more sensors to monitor conditions within the exhaust system.

SUMMARY

Implementations described herein relate to features for a single module aftertreatment system.

One implementation relates to a single module aftertreatment system comprising casing and a catalyst within the casing. A sensor mount is coupled to the casing. The sensor mount may be angled relative to a portion of the casing at a position where the sensor mount is coupled to the casing. In some implementations, the sensor mount includes a first attachment leg, a second attachment leg, and an angled mounting portion. The angled mounting portion connects the first attachment leg to the second attachment leg. The sensor mount is coupled to the casing by the first attachment leg and the second attachment leg such that the first attachment leg, the second attachment leg, and the angled mounting portion form an air gap relative to the casing. In further implementations, the first attachment leg includes a first vertical portion and a first attachment portion, and the second attachment leg includes a second vertical portion and a second attachment portion. In some instances, the second vertical portion of the second attachment leg is shorter than the first vertical portion of the first attachment leg. In some further implementations, the first attachment portion includes a first extension and a second extension. The first extension and second extension couple the sensor mount to the casing and reduce conductive heat transfer from the casing to the sensor mount. In some instances, the first extension and the second extension are curved so as to conform to a curvature of the casing. The single module aftertreatment system may also include insulation positioned within at least a portion of the air gap formed by the first attachment leg, the second attachment leg, and the angled mounting portion.

BRIEF DESCRIPTION

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for a single module aftertreatment system. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In some systems, a single module aftertreatment system may reduce the size of the system, decrease the costs by reducing the number of parts, and simplify designing needs by having a consistent configuration and reducing the footprint of the system. A single module aftertreatment system may include a number of aspects, including an outer beaded body for mounting and joint interfaces, sealed electrical connector backshells, variable sizing to facilitate catalyst retention and welding of mating components, integrated sensor harness and aftertreatment system module alignment and sensor bracket locating features, a diesel particulate filter outlet mounting ring recessed to allow closer assembly of sub-systems, a flare ring coupling to eliminate placement of the coupling in transition zone, a stackable sensor module mount, an angled sensor module mounting, tapered pressure sensor tubes to enable better water drainage, and/or a dual mounting sensor table.

II. Overview of Aftertreatment System

Figure 1:
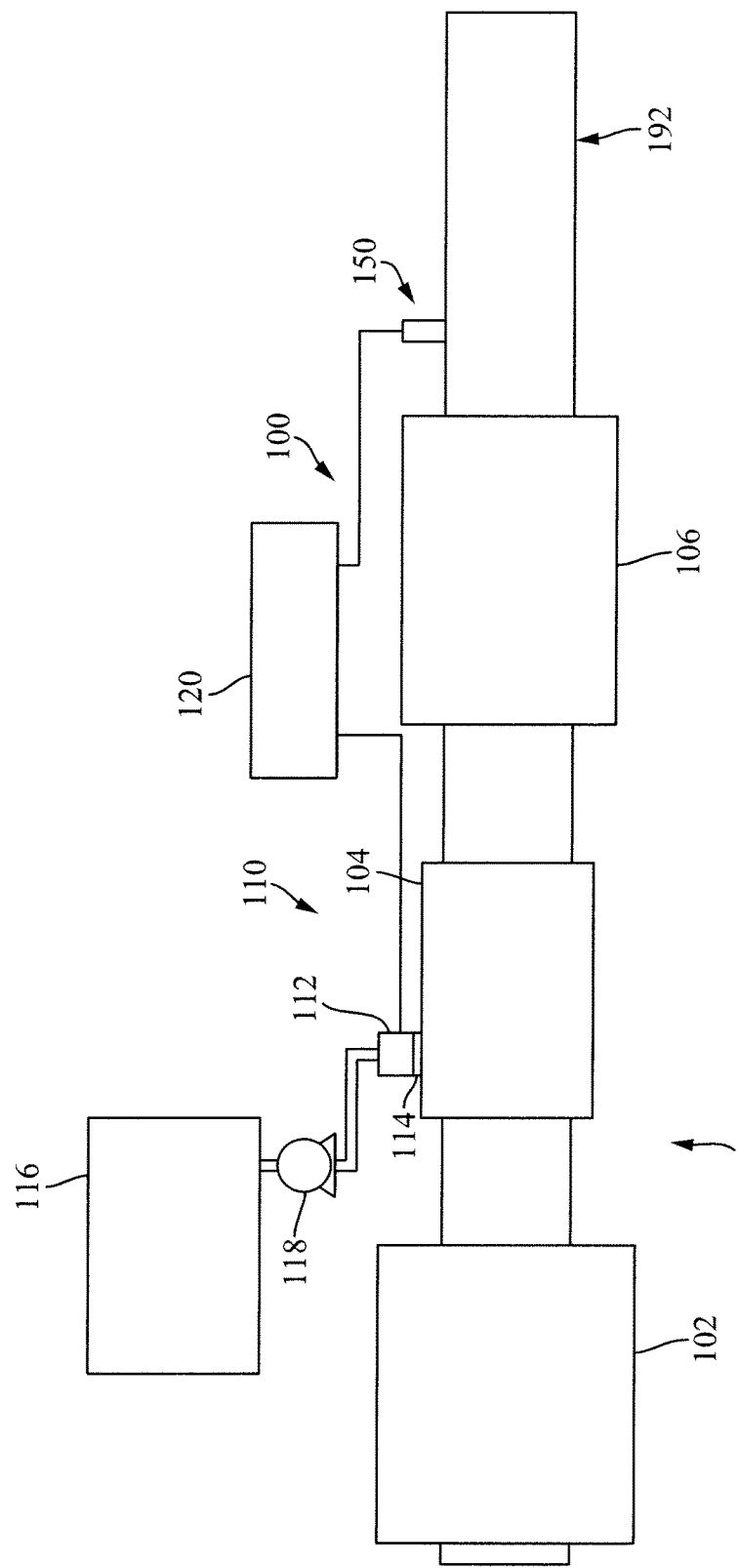
FIG. 1 is a block schematic diagram of an example selective catalytic reduction system having an example reductant delivery system for an exhaust system.

FIG. 1 depicts an aftertreatment system 100 having an example reductant delivery system 110 for an exhaust system 190. The aftertreatment system 100 includes a diesel particulate filter (DPF) 102, the reductant delivery system 110, a decomposition chamber or reactor 104, a SCR catalyst 106, and a sensor 150.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF), into ammonia. The decomposition chamber 104 includes a reductant delivery system 110 having a dosing module 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a NO reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst 106 may be combined into a single unit, such as an SDPF. In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the SCR catalyst 106, it should be understood that the sensor 150 may be positioned at any other position of the exhaust system 190, including upstream of the DPF 102, within the DPF 102, between the DPF 102 and the decomposition chamber 104, within the decomposition chamber 104, between the decomposition chamber 104 and the SCR catalyst 106, within the SCR catalyst 106, or downstream of the SCR catalyst 106. In addition, two or more sensor 150 may be utilized for detecting a condition of the exhaust gas, such as two, three, four, five, or size sensor 150 with each sensor 150 located at one of the foregoing positions of the exhaust system 190.

The aftertreatment system 100 may be formed into a single module aftertreatment system having one or more of the following features.

III. Example Angled Sensor Mount

Figure 2:
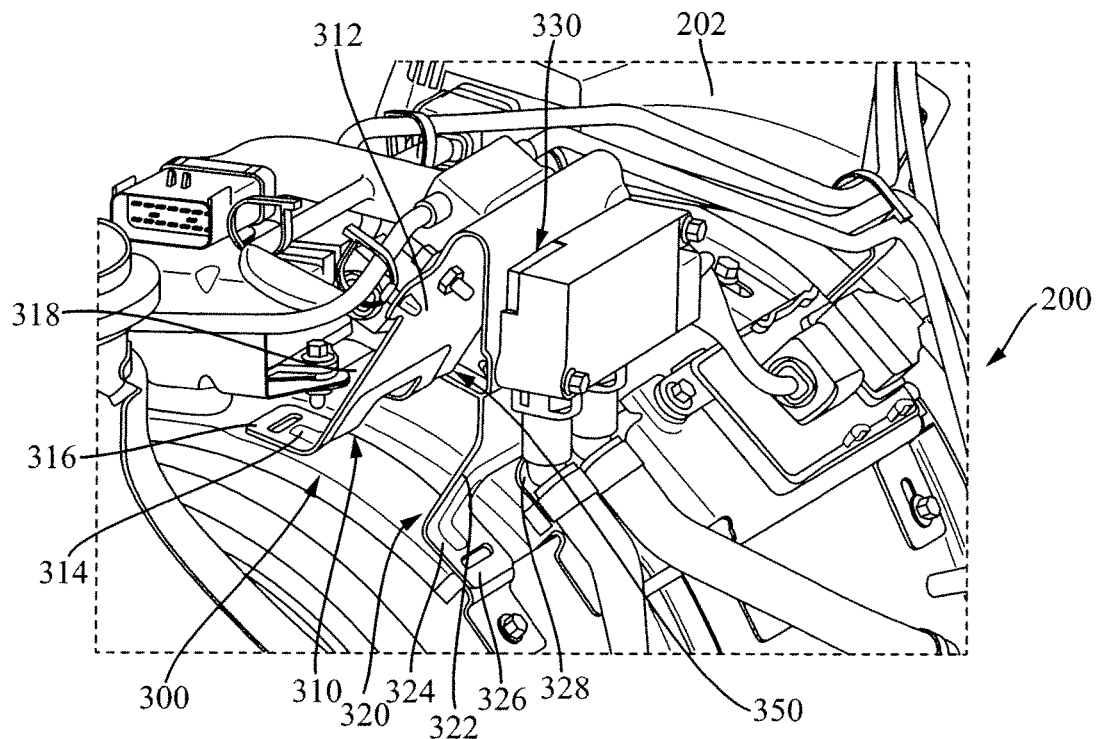
FIG. 2 is a perspective view of an angled sensor mount.
Figure 3:
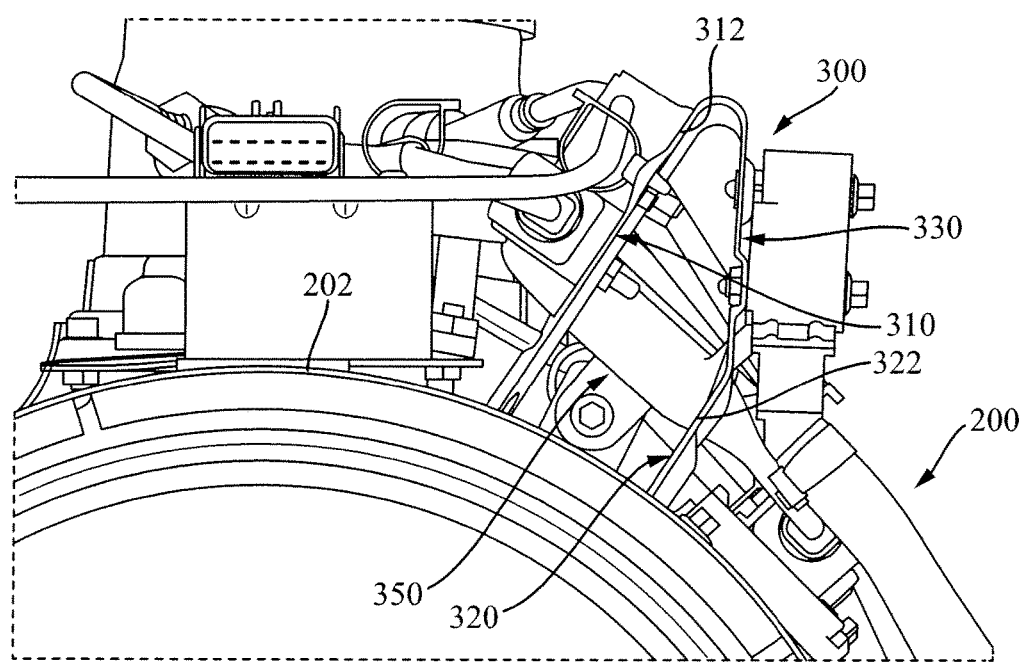
FIG. 3 is an elevation view of the angled sensor mount of FIG. 2.

FIGS. 2-3 depict an example angled sensor mounting plate 300 attached to an outer casing 202 of a single module aftertreatment system 200. As shown in FIGS. 2-3, an angled sensor mount 300 may be provided for coupling sensor components, such as a pressure sensor component, and/or other components associated with monitoring aspects of the exhaust gas flow within the single module aftertreatment system 200. The angled sensor mount 300 provides a mounting surface for one or more components at an angle that is a non-90 degree and/or non-tangential angle relative to the portion of the outer casing 202 at a position where the angled sensor mount 300 is attached to the outer casing 202. The angled sensor mount 300 includes a first attachment leg 310 and a second attachment leg 320. The first attachment leg 310 includes a first vertical portion 312 extending radially from the outer casing 202 of the single module aftertreatment system 200 and a first attachment portion 314 extending substantially perpendicular and/or at any other angle from the first vertical portion 312. In some implementations, the first attachment portion 314 may have a curvature to conform to a curvature of the outer casing 202. In some instances, the first attachment portion 314 may have a first extension 316 and a second extension 318 to provide a gap between the first extension 316 and the second extension 318, such as to accommodate an attachment strap, wiring, pressure tubing, and/or other components passing through the gap. The first extension 316 and second extension 318 may also minimize conductive heat transfer from the single module aftertreatment system 200 to the angled sensor mount 300 while providing sufficient attachment points for coupling the angled sensor mount 300 to the single module aftertreatment system 200.

The second attachment leg 320 includes a second vertical portion 322 extending radially from the outer casing 202 of the single module aftertreatment system 200 and a second attachment portion 324 extending substantially perpendicular and/or at any other angle from the second vertical portion 322. In some implementations, the second attachment portion 324 may have a curvature to conform to a curvature of the outer casing 202. In some instances, the second attachment portion 324 may have a first extension 326 and a second extension 328 to provide a gap between the first extension 326 and the second extension 328, such as to accommodate an attachment strap, wiring, pressure tubing, and/or other components passing through the gap. The first extension 326 and second extension 328 may also minimize conductive heat transfer from the single module aftertreatment system 200 to the angled sensor mount 300 while providing sufficient attachment points for coupling the angled sensor mount 300 to the single module aftertreatment system 200.

The second vertical portion 322 of the second attachment leg 320 is shorter than the first vertical portion 312 of the first attachment leg 310. The vertical potions 312, 322 are connected together by an angled mounting portion 330. The angled mounting portion 330 is angled relative to the outer casing 202 such that it is at a non-90 degree and/or non-tangential orientation relative to first and/or second attachment legs 310, 320. In some implementations, the interface between the angled mounting portion 330 and the vertical portions 312, 322 may be a bent or curved portion. In other implementations, the interface between the angled mounting portion 330 and the vertical portions 312, 322 may be a joint, such as a welded joint between flat plates. In some instances, the angled mounting portion 330 may be tangential relative to the outer casing 202 and/or may be any other angle relative to the outer casing 202. In some implementations, the first attachment leg 310, the second attachment leg 320, and the angled mounting portion 330 may be formed of a single piece of material, such as a metal, and may be bent into the corresponding shape.

The first vertical portion 312 of the first attachment leg 310 and the second vertical portion 322 of the second attachment leg 320 are spaced apart to provide an air gap 350 between the first attachment leg 310, the second attachment leg 320, and the angled mounting portion 330. Such an air gap 350, the first vertical portion 312 of the first attachment leg 310, and the second vertical portion 322 of the second attachment leg 320 provide an offset from the outer casing 202, such as a portion of a muffler, to allow air to pass below and/or across components mounted to the angled mounting portion 330 to reduce thermal heat transfer, either from the single module aftertreatment system 200 to the mounted component and/or from the mounted component to the single module aftertreatment system 200. In some implementations, insulation may be provided in the air gap 350 to further reduce heat transfer from the single module aftertreatment system 200. The angled sensor mount 300 configuration may also reduce the overall space to package such components or modules. For instance, the radially offset or spacing provided by the angled sensor mount 300 permits multiple components, sensors, and/or other modules to be mounted in the same longitudinal plane of the outer casing 202 of the single module aftertreatment system 200 at various radial positions relative to the outer casing 202, thereby reducing the longitudinal length needed for mounting several components, sensors, and/or other modules for the single module aftertreatment system 200. Moreover, the angled sensor mount 300 allows air to pass along all sides of the mounting system, thereby reducing heat transfer from the single module aftertreatment system 200 and/or convectively cooling the angled sensor mount 300 and/or a component mounted to the angled mounting portion 330.

In some implementations, components, sensors, and/or other modules may also be mounted to the first vertical portion 312 of the first attachment leg 310 and/or the second vertical portion 322 of the second attachment leg 320.

The angled sensor mount 300 may be a one piece body made up of a single homogeneous continuum of material, such as a single piece of metal, composite, and/or other material. In some implementations, the angled sensor mount 300 may be a single stamped piece of metal. To construct the angled sensor mount 300, the second attachment leg 320 may be formed by bending a portion of the single piece to form a second bend of a second angle as the interface between the angled mounting portion 330 and the second attachment leg 320. In some implementations, the second angle may be any angle and may, in some implementations, be between 0 and 90 degrees, 0 and 45 degrees, and/or 10 and 30 degrees. The first attachment leg 310 may be formed by bending a portion of the single piece to form a first bend of a first angle as the interface between the angled mounting portion 330 and the first attachment leg 310. In some implementations, the first angle may be any angle and may, in some implementations, be between 90 and 180 degrees, 90 and 160 degrees, and/or 120 and 135 degrees. In some implementations, the formation of the first attachment leg 310 may be performed before the formation of the second attachment leg 320.

The first attachment portion 314 may be formed by forming a third bend at a third angle as the interface between the first attachment portion 314 and the first vertical portion 312. The third angle may be any angle and may, in some implementations, be between 120 and 60 degrees, 110 and 70 degrees, 100 and 80 degrees, and/or approximately 90 degrees. In some implementations, the formation of the first attachment portion 314 forms the first extension 316 and second extension 318. In some implementations, the first attachment portion 314 and/or the first extension 316 and second extension 318 may be curved along a length to substantially conform to a curvature of the outer casing 202 of the single module aftertreatment system 200.

The second attachment portion 324 may be formed by forming a fourth bend at a fourth angle as the interface between the second attachment portion 324 and the second vertical portion 322. The fourth angle may be any angle and may, in some implementations, be between 120 and 60 degrees, 110 and 70 degrees, 100 and 80 degrees, and/or approximately 90 degrees. In some implementations, the formation of the second attachment portion 324 forms the first extension 326 and second extension 328. In some implementations, the second attachment portion 324 and/or the first extension 326 and second extension 328 may be curved along a length to substantially conform to a curvature of the outer casing 202 of the single module aftertreatment system 200.

The angled sensor mount 300 may be coupled to the outer casing 202 of the single module aftertreatment system 200, such as via bolts, clips, clamps, belts, welding, etc. One or more components can be mounted to the angled sensor mount 300, such as onto the first vertical portion 312 of the first attachment leg 310, the second vertical portion 322 of the second attachment leg 320, and/or the angled mounting portion 330.

Such angled sensor mount 300 can permit longitudinally compact mounting of components while also reducing heat transfer to the mounted components and/or increasing the convective cooling surfaces to cool the angled sensor mount 300 and/or components mounted thereto.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As utilized herein, the terms "approximately," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A single module aftertreatment system comprising:
   a casing;
   a catalyst within the casing; and
   a sensor mount coupled to the casing,
   wherein the sensor mount comprises a first attachment leg, a second attachment leg, and an angled mounting portion, the angled mounting portion connecting the first attachment leg to the second attachment leg; and
   wherein the sensor mount is coupled to the casing by the first attachment leg and the second attachment leg, and wherein the first attachment leg, the second attachment leg, and the angled mounting portion form an air gap relative to the casing.

2. The single module aftertreatment system of claim 1, wherein the first attachment leg includes a first vertical portion and a first attachment portion, wherein the second attachment leg includes a second vertical portion and a second attachment portion, and wherein the second vertical portion of the second attachment leg is shorter than the first vertical portion of the first attachment leg.

3. The single module aftertreatment system of claim 2, wherein the first attachment portion includes a first extension and a second extension, the first extension and the second extension coupling the sensor mount to the casing and reducing conductive heat transfer from the casing to the sensor mount.

4. The single module aftertreatment system of claim 3, wherein the first extension and the second extension are curved so as to conform to a curvature of the casing.

5. The single module aftertreatment system of claim 4 further comprising insulation positioned within at least a portion of the air gap formed by the first attachment leg, the second attachment leg, and the angled mounting portion.

6. A sensor mount for mounting components of an aftertreatment system, the sensor mount comprising:
   a first attachment leg comprising a first vertical portion and a first attachment portion;
   a second attachment leg;
   an angled mounting portion connecting the first attachment leg to the second attachment leg,
   wherein the first attachment portion of the first attachment leg comprises a first extension and a second extension;
   wherein the sensor mount is coupled to a casing of the aftertreatment system by the first extension, the second extension, and the second attachment leg;
   wherein the first extension and the second extension reduce conductive heat transfer from the casing to the sensor mount; and
   wherein the first attachment leg, the second attachment leg, and the angled mounting portion form an air gap relative to the casing.

7. The sensor mount of claim 6, wherein the second attachment leg comprises a second vertical portion and a second attachment portion, and wherein the second attachment portion comprises a first extension and a second extension.

8. The sensor mount of claim 7, wherein the second vertical portion is shorter than the first vertical portion.

9. The sensor mount of claim 6, wherein insulation is positioned within the air gap.

10. The sensor mount of claim 6, wherein the first extension and the second extension are curved to conform to a curvature of the casing.

11. A sensor mount for mounting components of an aftertreatment system, the sensor mount comprising,
   a first attachment leg comprising a first vertical portion and a first attachment portion extending from the first vertical portion; and a second attachment leg comprising a second vertical portion and a second attachment portion extending from the second vertical portion, wherein each of the first attachment portion and the second attachment portion comprises a first extension and a second extension, and wherein the first extension and the second extension are curved to conform to a curvature of a casing of the aftertreatment system for mounting the sensor mount to the casing.

12. The sensor mount of claim 11, further comprising a mounting portion that connects the first attachment leg to the second attachment leg.

13. The sensor mount of claim 12, wherein the first attachment leg, the second attachment leg, and the mounting portion define an air gap, and wherein insulation is positioned within the air gap.

14. The sensor mount of claim 12, wherein the mounting portion is angled relative to the casing, the first attachment leg, and the second attachment leg.

15. The sensor mount of claim 11, wherein each of the first vertical portion and the second vertical portion extends radially from a surface of the casing, and wherein the first attachment portion and the second attachment portion extend at an angle from the first vertical portion and the second vertical portion, respectively.

16. The sensor mount of claim 11, wherein the second vertical portion is shorter than the first vertical portion.

* * * * *